(No Model.)

T. W. DUFFY.
EXPANSION JOINT.

No. 350,422. Patented Oct. 5, 1886.

WITNESSES.
James F. Bligh.
Fred P. O'Neil.

INVENTOR.
Thomas Wm Duffy
by Geo. O. G. Coale
his attorney.

N. PETERS, Photo-Lithographer, Washington, D. C.

UNITED STATES PATENT OFFICE.

THOMAS WILLIAM DUFFY, OF MEDFORD, MASSACHUSETTS, ASSIGNOR, BY DIRECT AND MESNE ASSIGNMENTS, TO THE WAINWRIGHT MANUFACTURING COMPANY, OF PORTLAND, MAINE.

EXPANSION-JOINT.

SPECIFICATION forming part of Letters Patent No. 350,422, dated October 5, 1886.

Application filed April 30, 1884. Serial No. 129,798. (No model.)

*To all whom it may concern:*

Be it known that I, THOMAS WILLIAM DUFFY, of Medford, in the county of Middlesex and State of Massachusetts, a subject of Her Majesty Queen Victoria, have invented a new and useful Improvement in Expansion-Joints, of which the following is a specification.

My invention relates to expansion-joints—i. e., a form of connection for metallic pipes capable of conveying steam in which the expansive quality is provided for by the use of a piece of corrugated metallic tubing, this tubing forming the main portion of the joint, and being connected at each end with suitable flanges, by which it may be bolted to corresponding flanges on the ends of the pipes to be joined.

The novelty of my invention consists in the combination, with such a piece of tubing spirally corrugated, of two flanged hubs, each screw-threaded about its hub portion, with threads corresponding in size with the corrugations in the tube, (so that the hub may be screwed into one end of the tube and make a tight joint therewith,) together with two screw-collars, each capable of fitting about the outside of the tube into its corrugations, each collar being placed about the tube in such a way as to hold it against the hub and prevent the tube from splitting or spreading or losing its shape, so as to let the steam escape from the joint.

Figure 1:
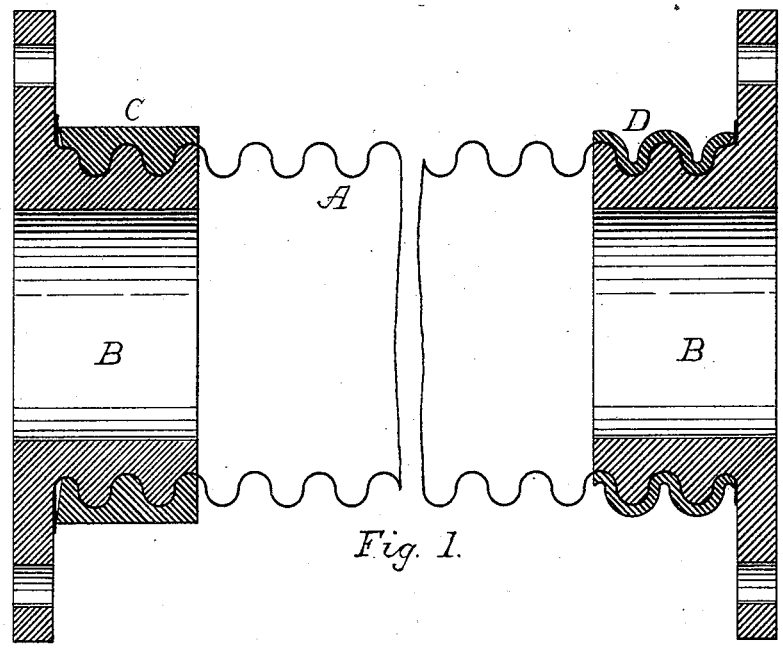
Figure 2:
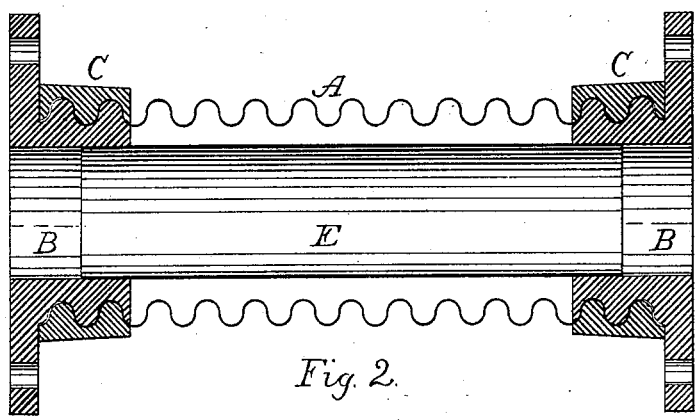

In the drawings are shown two expansion-joints in longitudinal section, Figure 1 being the simplest form of joint embodying my invention; and Fig. 2 is a similar joint provided with a strengthening-tube, which is useful at certain times, as below explained.

A is the spirally-corrugated tube. B B are hollow flanged hubs. Each has screw-threads about its hub portion of a size corresponding with the corrugations in the tube, and is adapted to be screwed into the tube and serve by means of its flange and suitable bolts to connect the joint with the next pipe in a series, the tube and hub being held together by the screw-threads in each. Around each end of the tube is a screw-collar—i. e., a collar provided with screw-threads on its interior surface fitting the corrugations upon the exterior of the tube. The purpose of this collar is to bind the tube against the hub, so as to prevent the tube from spreading and allowing the steam, &c., to escape from the joint. If thought best, the collar and the hub may be tapered a little, so as to insure a steam-tight joint.

The screw-collars in the drawings are marked C and D—the one C a piece of casting, the other, D, a piece of corrugated tubing. Either may be used.

In putting my joint together the collars are first screwed onto the tube. The hubs are then screwed a proper distance into the tube, either so that the end of the tube will bear against the flange or not, as thought best. In some cases the end of the tube can be spread after the collar has been screwed onto the tube, so that the joint will be made between the end of the flange and the end of the collar, or the joint may be made simply by the clasping of the tube by the collar. In any case a packing may be used, if thought best.

When a joint is used having two hubs the interiors of which are cylindrical, a plain tube long enough to rest upon both hubs may be set into the joint so as to slide or telescope as the tube expands or contracts, and hence relieve the corrugated tube from some pressure and friction. This form of joint is shown in Fig. 2, E being the sliding tube.

The spirally-corrugated metallic tube is a necessary element of this joint, for the reason that although circular corrugations might answer so far as the expanding qualities are concerned, unless the corrugations are spiral, the hub and collar cannot be combined therewith in the manner specified, an important advantage of my joint being that it can be put together without the use of rivets or any compression, contraction, or expansion of the parts.

Without the spirally-corrugated metallic tube the joint would be useless.

What I claim as my invention is—

The expansion-joint above described, consisting of the spirally-corrugated metallic tube A, provided at each end with a flanged hub, B, screw-threaded about its exterior, as shown, and adapted to screw into the end of said tube and fit into its corrugations, and the collar provided with screw-threads about its interior adapted to fit into the threads about the exterior of said tube, all as set forth.

In testimony whereof I have hereunto subscribed my name this 12th day of April, A. D. 1884.

THOMAS WM. DUFFY.

Witnesses:
C. D. WAINWRIGHT,
F. A. SEAMANS.